(12) United States Patent
Lepage et al.

(10) Patent No.: US 8,001,716 B1
(45) Date of Patent: Aug. 23, 2011

(54) LIGHTWEIGHT FISHING ROD AND A METHOD FOR MAKING A LIGHTWEIGHT FISHING ROD

(75) Inventors: James B. Lepage, Arlington, VT (US); James B. Logan, Arlington, VT (US); Steven M. Hemkens, Arlington, VT (US)

(73) Assignee: The Orvis Company, Inc., Sunderland, VT (US)

( * ) Notice: Subject to any disclaimer, the term of this patent is extended or adjusted under 35 U.S.C. 154(b) by 433 days.

(21) Appl. No.: 12/190,290

(22) Filed: Aug. 12, 2008

(51) Int. Cl.
*A01K 87/00* (2006.01)

(52) U.S. Cl. .................. 43/18.1 CT; 43/18.5; 428/36.3

(58) Field of Classification Search .............. 43/18.1 R, 43/18.1 CT, 18.5, 18.1 HR; 248/36.2, 36.3, 248/212, 219, 220; 428/36.2, 36.3, 212, 428/219, 220
See application file for complete search history.

(56) References Cited

U.S. PATENT DOCUMENTS

| | | | | |
|---|---|---|---|---|
| 4,061,806 A | * | 12/1977 | Lindler et al. | 428/34.5 |
| 4,083,140 A | * | 4/1978 | Van Auken et al. | 43/18.5 |
| 4,686,787 A | * | 8/1987 | Whipp | 43/18.1 CT |
| 4,759,147 A | * | 7/1988 | Pirazzini | 43/18.5 |
| 5,178,706 A | * | 1/1993 | Nishibara et al. | 156/229 |
| 5,251,640 A | * | 10/1993 | Osborne | 600/585 |
| 5,338,604 A | * | 8/1994 | Yasui | 428/36.3 |
| 5,397,636 A | * | 3/1995 | Miyao et al. | 428/195.1 |
| 5,538,769 A | * | 7/1996 | Sandman, Jr. | 428/36.3 |
| 5,926,992 A | * | 7/1999 | Tsurufuji et al. | 43/24 |
| 5,968,621 A | * | 10/1999 | Okada | 428/36.3 |
| 6,092,324 A | | 7/2000 | Lepage et al. | |
| 6,192,615 B1 | * | 2/2001 | Ono et al. | 43/18.1 R |
| 6,301,821 B1 | * | 10/2001 | Suzue et al. | 43/18.1 R |
| 6,524,195 B1 | * | 2/2003 | Kusumoto | 473/319 |
| 6,601,334 B1 | * | 8/2003 | Ono et al. | 43/18.1 R |
| 6,709,347 B1 | * | 3/2004 | Ono et al. | 473/319 |
| 7,043,868 B2 | | 5/2006 | Ahn | |
| 2005/0223617 A1 | * | 10/2005 | Morita et al. | 43/18.5 |

OTHER PUBLICATIONS

Cytec Technical Bulletin, "Cycom® 997 Toughened Epoxy Resin", Oct. 18, 2005, pp. 1-10.
Cytec Technical Bulletin, "Cycom® 2020 Epoxy Prepreg", Aug. 10, 2001, pp. 1-10.
Orvis Fly Fishing Catalog, Spring 2006, pp. 68-73.
Orvis Fly Fishing Catalog, 2007, pp. 24-27.

* cited by examiner

*Primary Examiner* — Kimberly Smith
*Assistant Examiner* — Danielle Clerkley
(74) *Attorney, Agent, or Firm* — Fay Sharpe LLP; Karl W. Hauber

(57) ABSTRACT

A fishing rod having improved strength and durability to weight characteristics is provided using a thermoplastic toughened epoxy resin. The method of manufacturing this fishing rod includes the use of an insulating layer around rod blanks during a high temperature cure stage.

13 Claims, 7 Drawing Sheets

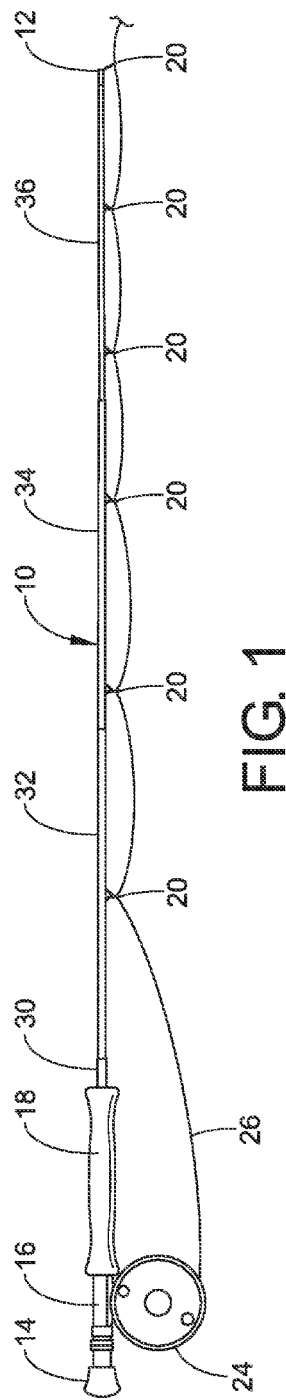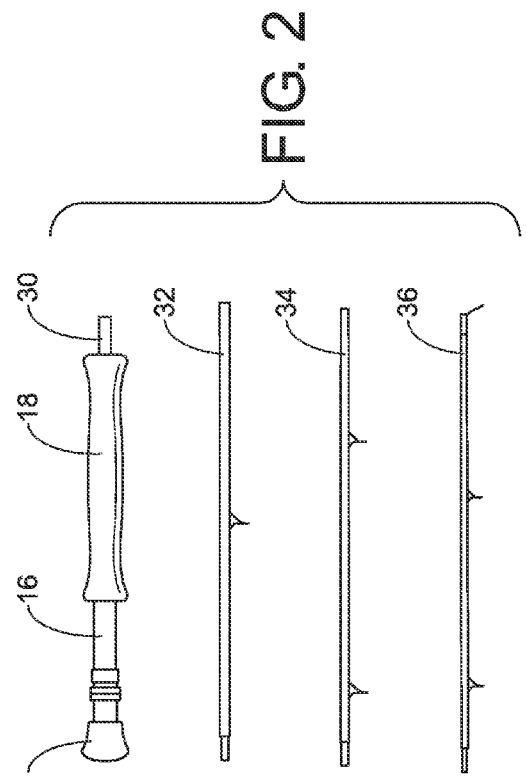

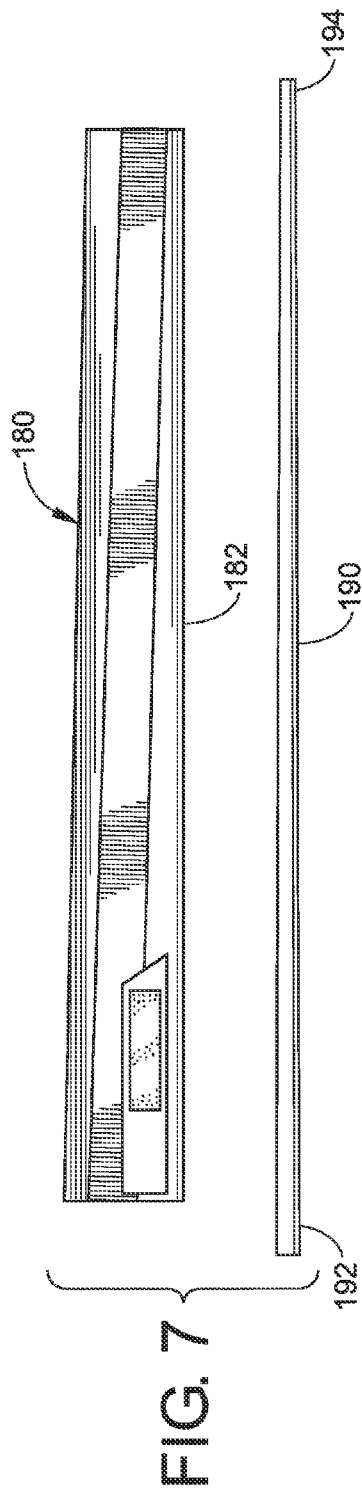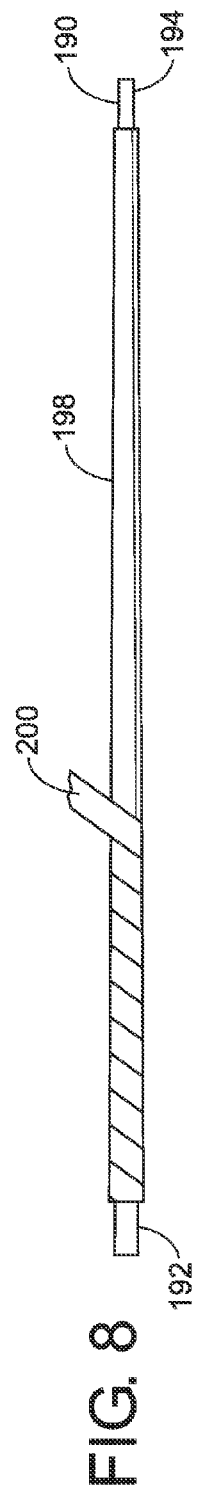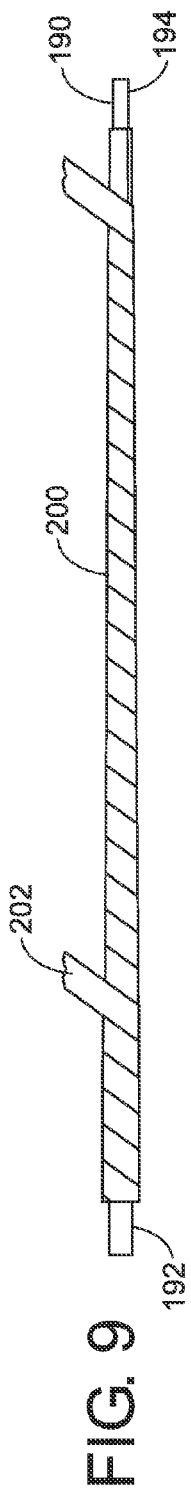

LIGHTWEIGHT FISHING ROD AND A METHOD FOR MAKING A LIGHTWEIGHT FISHING ROD

BACKGROUND OF THE INVENTION

The present invention relates in general to fishing rods and more particularly to fly fishing rods of discreet sections connectable to one another and being fiber reinforced.

Fishing rods are available to anglers from many sources. Fly fishing rods are often available as multi-segment rods in a protective case. Fly fishing rods are commonly available in two, three, four or more segments. The segments are conveniently stored and transported in a tubular case. When an angler wishes to use the rod, the segments are removed from the case and assembled. A reel is added and a line and leader from the reel are fed through line guides on the rod. A fly is tied to the end of the leader and the angler is then ready to fish.

Fishing rods in general and fly fishing rods in particular are used in a very wide variety of settings in pursuit of a very wide variety of fish. In fly fishing, the angler often uses a small light dry fly or wet fly to catch fish. These flies are so light that they cannot be cast by themselves. Rather, the angler casts the weight of the line which carries the leader and fly to the intended destination and presents it to the fish. Fly rods must have appropriate strength and flex characteristics to allow an angular to cast this line, leader and fly combination. Moreover, fly rods are designed with different characteristics to provide different feels as desired by anglers. Thus, fly fishing rods are used in very small fresh water streams in pursuit of smaller, light weight fish such as brook trout and blue gill. On the other extreme, fly fishing rods are used in large streams and in the ocean pursuing steelhead trout, salmon, larger tropical fish such as permit and tarpon and even bill fish.

To meet all these needs, fly fishing rods come in various lengths and are constructed to accommodate various line weights. Fly fishing rods are designed and constructed to be appropriately strong, have appropriate flexing and energy transfer characteristic and to have a good feel in the hand for the angular. Fly fishing rods are also constructed to be light in weight.

Many fly rods and other fishing rods are now constructed from high tech composite materials. Thus, fly rods are made from rod blanks comprised of carbon fibers or other high tech synthetic fibers embedded in resin matrixes. Carbon fiber in resin matrix technology is also used in the aerospace industry. Some of the same fibers and matrixes used in constructing high tech aircraft are used in constructing high tech fishing rods.

There has been much effort placed in designing fly rods to have appropriate strength, flex characteristics, weight, durability, and the like. There remains a need for fishing rods, especially fly fishing rods, which are strong, durable, appropriately flexible and efficient in energy transfer, and light weight.

SUMMARY OF THE INVENTION

In accordance with the invention there is provided a fishing rod comprised of a plurality of rod segments, each rod segment constructed from a rod segment blank. The rod segment blanks have at least one layer of carbon fibers embedded in a thermoplastic toughened resin with carbon fibers running axially along the blank and at least one layer of carbon fibers embedded in a thermoplastic toughened resin with the carbon fibers orientated in a direction other than axially along the rod blank.

Still further in accordance with the invention, the thermoplastic toughened resin is a thermoplastic toughened epoxy resin.

Yet further in accordance with the invention, the layer of carbon fibers generally parallel to the axis of the rod blank have a carbon fiber areal weight of less than 120 grams per square meter.

Still further in accordance with the invention, the layer of carbon fibers not axial with respect to the rod blank are disposed either in a conical helix about 45° to the direction perpendicular to the rod segment blank axis, or generally perpendicular to the rod segment axis.

Still further in accordance with the invention, the layer of carbon fibers not generally parallel to the axis of the rod blank has an areal weight of less than 50 grams per square meter, preferably in the range of 20 grams per square meter to 35 grams per square meter and most preferably in the range of about 28 to 30 grams per square meter.

Still further in accordance with the present invention, a method of making a fishing rod blank segment comprises the steps of providing a tapered mandrel having an axis and an outer conical surface; provide a main flag prepreg of selected dimensions comprising carbon fibers orientated parallel to one another in a thermoplastic toughened resin matrix; providing a second flag prepreg of selected dimensions comprising carbon fibers orientated parallel to one another in a thermoplastic toughened resin matrix; creating a kit by laying the second flag prepreg upon the first flag prepreg such that the carbon fibers of the second flag are not parallel to the carbon fibers of the first flag and additional flags as desired; wrapping the kit about the mandrel such that the first flag carbon fibers are generally coplanar with the mandrel axis and generally parallel to the mandrel conical surface; wrapping a heat shrink film tape about the assembled mandrel and kit; wrapping an insulating film tape about the assembled mandrel kit and heat shrink film tape; curing the kit by application of heat to the assembled mandrel kit and tapes; removing the heat shrink film tape and insulating film tape from the cured kit; finishing and trimming the kit into a fishing rod blank segment.

Yet further in accordance with the invention, curing of the kit takes place at a temperature over 275° F., preferably over 300° and most preferably at a temperature of about 350°.

Still further in accordance with the invention, the insulating film tape used is a polytetrafluorethylene film tape of about 1 mil thickness.

Yet further in accordance with the invention the main flag used in creating the kit has a fiber areal weight of less than 120 grams per square meter and the second flag has a fiber areal weight of less than 50 grams per square meter, preferably in the range of from 20 grams per square meter to 35 grams per square meter and most preferably in the range of 28 to 30 grams per square meter.

Yet further in accordance with the invention the thermoplastic toughened resin matrix used is a thermoplastic toughened epoxy resin.

It is an object of the present invention to provide a fishing rod which is tough, strong, durable, has appropriately controllable flex characteristics and energy transfer characteristics and which is light in weight.

It is another object of the present invention to provide a fly fishing rod having improved casting characteristics.

It is still another object of the present invention to provide a fly fishing rod having a perceived lightness in the hand of an angular.

It is yet another object of the present invention to provide a method of manufacturing fly fishing rod segment blanks having improved characteristics which method of manufacturing is controllable, repeatable and economic to perform.

These and other objects of the present invention will become evident from the following detailed description of taken in conjunction with the accompanying drawings which form a part hereof.

BRIEF DESCRIPTION OF THE DRAWINGS

FIG. 1 shows schematically a fly fishing rod with an attached reel and fly line;

FIG. 2 shows the fly fishing rod of FIG. 1 disassembled into four pieces;

FIG. 7 shows four of the flags seen in FIG. 4 assembled into a kit alongside a mandrel used to construct the butt middle segment blank;

FIG. 8 shows the kit of FIG. 7 wrapped upon the mandrel of FIG. 7 and shrink film tape being wrapped about the assembled mandrel and kit;

FIG. 9 shows the mandrel, kit, and shrink film tape shown in FIG. 8 and the application of thermal insulating film tape upon this assembly; and, FIG. 10 is a block diagram illustrating the steps in the method of making a fly rod.

DETAILED DESCRIPTION OF THE INVENTION

Figure 3:
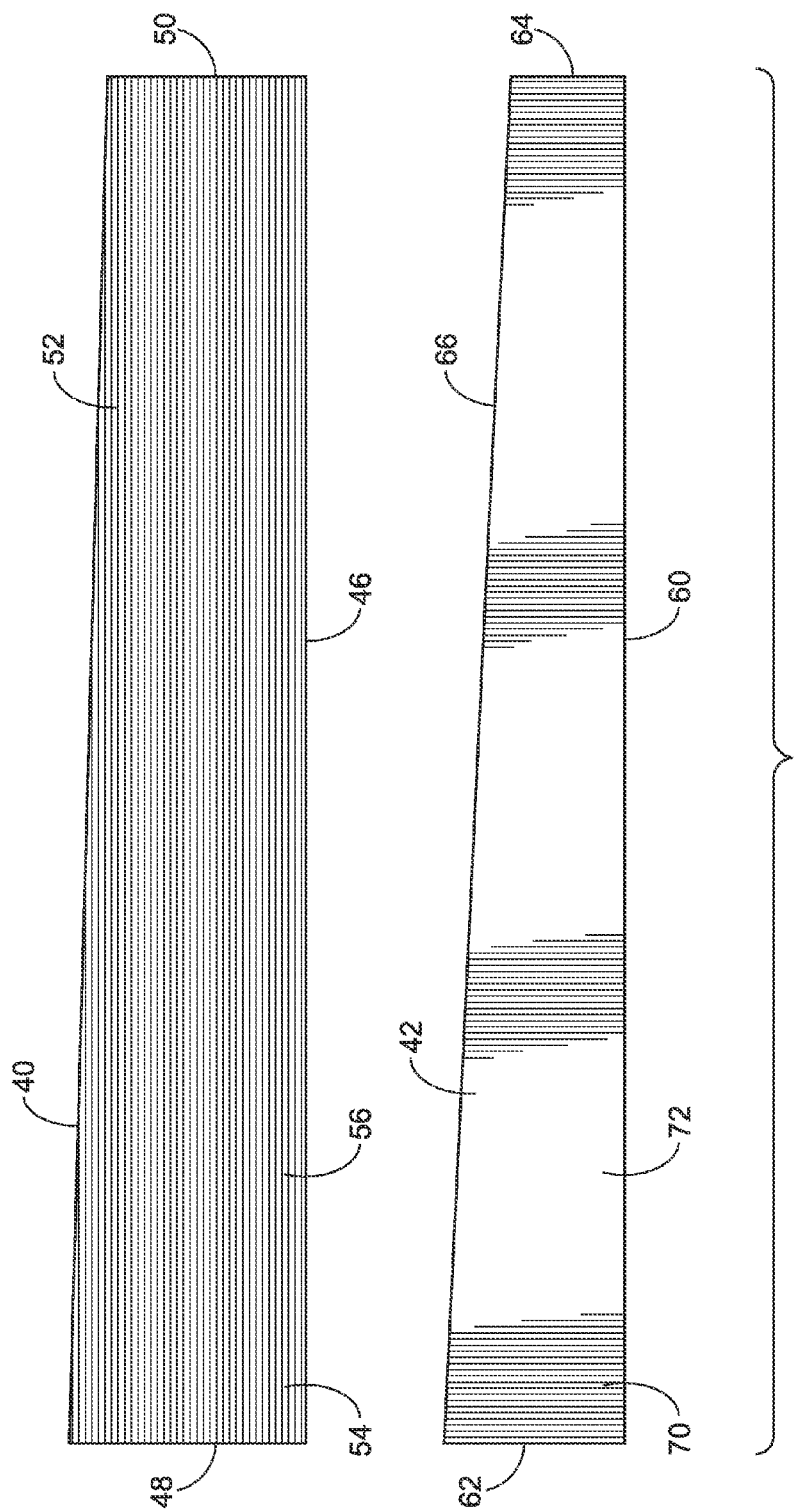
FIG. 3 shows the flags used to construct the butt segment blank of the fly rod of FIGS. 1 and 2.

Referring now to the drawings wherein the showings are made for the purposes of illustrating a preferred embodiment of the invention only and not for the purposes of limiting same.

FIG. 1 shows a fly fishing rod 10 having a tip 12 and a butt 14. The fly fishing rod 10 also includes a reel seat 16, a grip or handle 18 and a number of line guides 20. The fly rod 10 is shown assembled with a fly fishing reel 24 and a fly line 26. The fly fishing rod 10 is separable into four segments, a butt segment 30, a butt middle segment 32, a tip middle segment 34 and a tip segment 36. These rod segments are shown in FIG. 1 assembled one to the other by ferrules. The segments are shown in FIG. 2 disassembled as the segments would be configured for storage or transportation of the fly rod. This general configuration of a fly rod of multiple segments which can be easily assembled and disassembled is conventional.

The four fishing rod segments seen in FIG. 2 are built by mounting components such as the reel seat 16, the handle or grip 18, and the line guides 20 on fishing rod segment blanks. The structure and method of making the fishing rod segment blanks of the current invention are illustrated in FIGS. 3-10 of the application. The segments illustrated are for a four piece, five weight rod. However, the structure and method of manufacturing are equally applicable to fishing rods having fewer or more than four segments; and, being lighter or heavier than a five-weight rod; and, having a different overall length or different flexing characteristic than the rod specifically described.

The fly fishing rod segment blanks of the present invention are constructed of layers. For each segment, some or all of these layers are first cut to shape and assembled by laying one layer on top of another layer to form a kit. This kit is then wrapped upon a tapered mandrel, other components possibly added, and the wrapped kit is then prepared for curing and cured. The components forming the fly fishing rod blank segment are described with reference to FIGS. 3-6. The assembly of these components is further described with reference to FIG. 7. The preparation for curing is described with respect to FIGS. 8 and 9. The steps of this process are described in more detail with reference to FIG. 10.

Referring now to FIG. 3, a butt first flag 40 and a butt second flag 42 are illustrated. The butt first flag 40 is cut from a prepreg available from Cytec Engineered Materials of Tempe, Ariz. A prepreg is generally an organized group of fibers disposed in an uncured resin matrix carried on a backing. A wide variety of prepregs employing different polymer matrixes and different fibers arrayed in different ways are available. The prepreg used for the butt first flag 40 is a unidirectional high modulus carbon fiber in a toughened epoxy resin. The epoxy resin is toughened with a thermoplastic material. The areal weight of carbon fibers in this prepreg is less than 120 grams per square meter. With respect to fly fishing rod applications, this is believed to be lighter than prior art materials.

As can be seen in FIG. 3, the butt first flag 40 is cut with four straight edges. The lower edge 46 is 36 inches long; the butt edge 48 is perpendicular to the lower edge and 6¼ inches long. The tip edge 50 is also perpendicular to the lower edge 46 and 5¼ inches long. The fourth edge 52 is opposite the lower edge 46 and connects the ends of the butt edge 48 and tip edge 50 not adjacent the lower edge 46. Thus, a slightly tapered four-sided flag 40 is created. In this flag, the carbon fibers 54 are all parallel to the lower edge 46 and embedded in a resin matrix 56. The carbon fibers 54 and resin 56 are carried upon a coated paper backing for ease of handling. All of the flags are initially also protected by a top sheet.

The butt second flag 42 is similar in shape to the butt first flag 40. The butt second flag 42 has a lower edge 60 which is 36 inches long. The second flag butt edge 62 is perpendicular to the lower edge 60 and 4¾ inches long. The second flag tip edge 64 is perpendicular to the lower edge 60 and 3 inches long. The second flag fourth edge 66 connects the ends of the butt edge 62 and the tip edge 64 remote from the lower edge 60. A tapered four sided flag is created. The carbon fibers 70 in the second flag 42 are orientated parallel to one another and perpendicular to the second flag lower edge 60. The carbon fibers are embedded in a resin matrix 72 and carried on a coated backing sheet.

The fly fishing rod butt segment rod blank is created by exposing the top surface of the butt first flag 40 and the bottom surface of the butt second flag 42 and smoothly laying the second flag on top of the first flag with the two lower edges coincident to create a kit. The top cover of the second flag is then removed and the assembled kit is rolled upon a mandrel, further processed and cured. This process will be described in more detail hereinafter with respect to other blank segments. The resulting segment is a gently tapered tubular element with a side wall formed by the alternating layers of the butt first flag and butt second flag.

The second flags in all of the rod segments described herein are sometimes referred to in the trade as "scrims" although the fibers are orientated parallel to one another.

Figure 4:
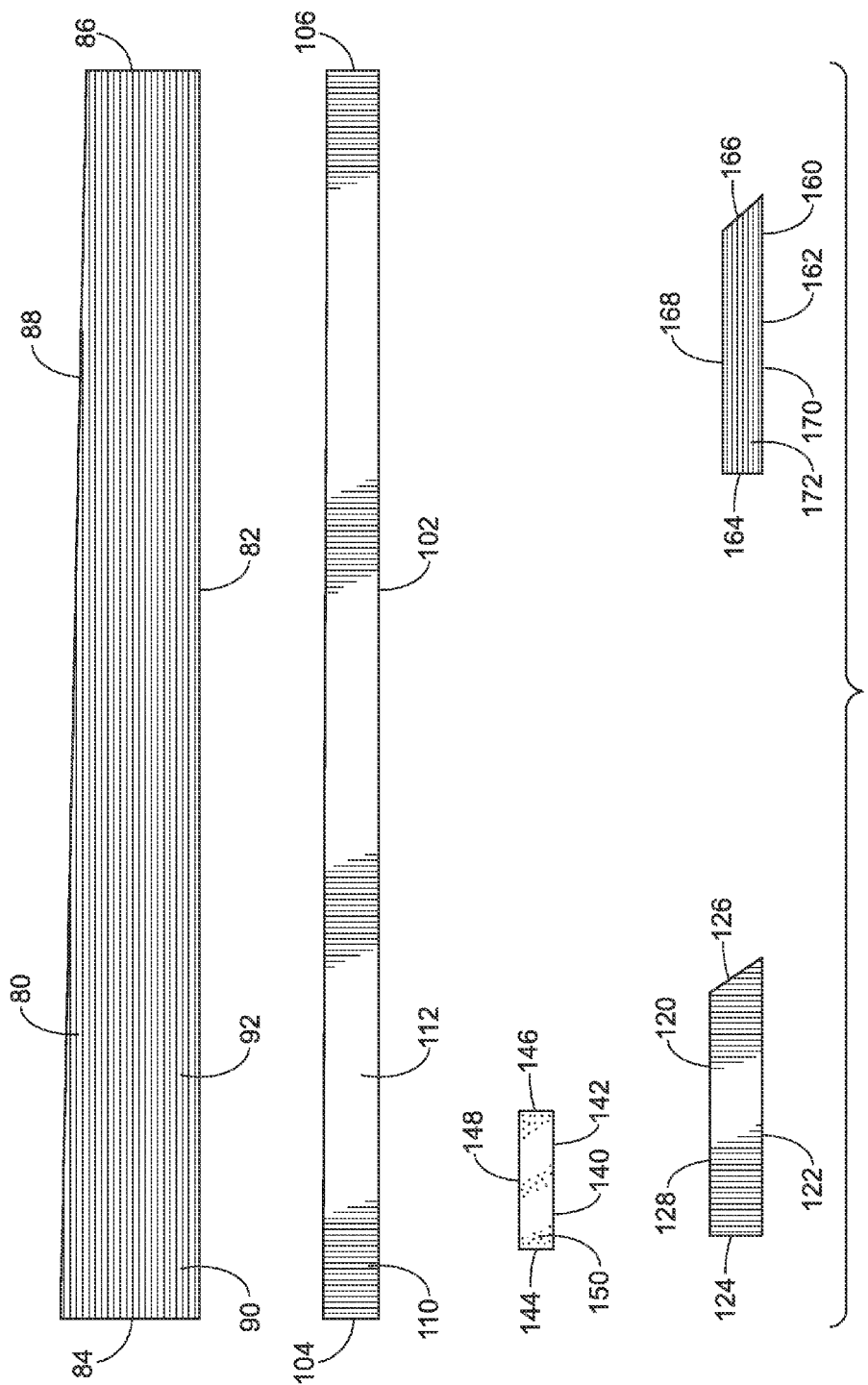
FIG. 4 shows the flags used to construct the butt middle segment blank of the fly rod of FIGS. 1 and 2.

Making reference to FIG. 4, the flags used in constructing the butt middle segment 32 are illustrated. The butt middle segment is the most complicated segment of the four segments. Five separate flags are illustrated in FIG. 4. The butt middle first flag 80 has a straight lower edge 82 which is 36 inches long. The butt middle first flag also has a butt edge 84 perpendicular to the lower edge and 4 inches long. The butt middle first flag tip edge 86 is also perpendicular to the lower edge 82 and is 3¼ inches long. The butt middle first flag fourth edge 88 is straight and connects the ends of the butt edge 84 and tip edge 86 remote from the lower edge 82. A flag with four straight edges with the tip edge and butt edge parallel to one another and the fourth edge closer to the lower edge at the tip end than at the butt end is defined. The butt middle first flag 80 has carbon fibers 90 parallel to one another and parallel to the lower edge 82. The carbon fibers 90 are embedded in a resin matrix 92.

The butt middle second flag 100 has a shape similar to the butt middle first flag. The butt middle second flag has a 36 inch long lower edge 102, a 1⅝ inch long butt edge 104 and a 1½ inch long tip edge 106. The butt middle second flag has a fourth edge 108 connecting the ends of the butt edge 104 and tip edge 106 remote from the lower edge 102. The carbon fibers 110 in the butt middle second flag are orientated parallel to one another and perpendicular to the lower edge 102. The carbon fibers 110 are embedded in a resin matrix 112.

The butt middle third flag 120 is shaped differently from the butt middle first flag and second flag. The butt middle third flag lower edge 122 is 8 inches long. The butt middle third flag butt edge 124 is perpendicular to the lower edge 122 and 1½ inches long. The butt middle third flag fourth edge 128 is parallel to the butt middle third flag lower edge 122 and 7 inches long. The butt middle third flag tip edge 126 connects the ends of the lower edge 122 and fourth edge 128 remote from the butt edge 124. Thus, the butt middle third flag resembles a rectangle with a right triangle appended to one short edge. The butt middle third flag contains parallel carbon fibers 130 which are parallel to the butt edge 124 and perpendicular to the lower edge 122. The carbon fibers 130 are embedded in a resin matrix 132.

The butt middle fourth flag 140 is a rectangular flag with a lower edge 142 and fourth edge 148 parallel to one another. Both the lower edge 142 and the fourth edge 148 are 4 inches long. The butt middle fourth flag butt edge 144 and butt middle fourth flag tip edge 146 are perpendicular to the lower edge 142 and 1 inch long. The butt middle fourth flag has glass fibers 148 embedded in a resin matrix 150. The orientation of the glass fibers 148 in the butt middle fourth flag is not important as the fourth flag is not a strength element. Rather, the fourth flag is present to create an appropriate surface texture on the interior surface of the butt end of the butt middle rod segment. This interior surface forms the sidewall of the recess half of the ferrule connection joining the butt section 30 of the rod to the butt middle section 32 of the rod.

The butt middle fifth flag 160 resembles the butt middle third flag 122. The butt middle fifth flag lower edge 162 is parallel to the butt middle fifth flag fourth edge 168. The butt middle fifth flag lower edge 162 is 8 inches long while the butt middle fifth flag fourth edge 168 is 7 inches long. The butt middle fifth flag butt edge 164 is 1⅛ inch long and perpendicular to the fifth flag lower edge 162 and fourth edge 168. The fifth flag tip edge 166 connects the ends of the fifth flag lower edge 162 and fourth edge 168 remote from the butt edge. Thus, the fifth flag resembles a rectangle with a right triangle appended to one short edge 164. The butt middle fifth flag 160 has parallel carbon fibers 170 which are parallel to the lower edge 162 and fourth edge 168. The carbon fibers 170 are embedded in a resin matrix 172.

Referring now to FIG. 7, the assembly of the flags to form the butt middle segment blank of a fly rod is illustrated. The butt middle first flag 80 is laid out on its backing and its top protective sheet removed. The bottom protective sheet is removed from the butt middle second flag 100 and the butt middle second flag is smoothly placed upon the butt middle first flag in a particular orientation. The butt edges 84, 104 of the two flags are generally aligned. The lower edge 102 of the second flag 100 is spaced inwardly (upwardly) from the first flag lower edge 82. The lower edge 102 of the second flag 100 is slightly askew from the first flag lower edge 82. The butt end of the lower edge 102 of the second flag is spaced one inch upwardly (inwardly) of the lower edge 82 of the first flag 80. The tip end of the lower edge 102 of the second flag 100 is spaced upwardly (inwardly) ⅜ of an inch from the tip end of the lower edge 82 of the first flag. Thus, the second flag lies on top of the first flag in the half of the first flag near the lower edge 82 but not immediately at the lower edge 82.

The third flag 120 has its bottom protected layer removed and is laid upon the assembled first and second flag with its lower edge 122 coincident with the lower edge 82 of the first flag 80 and its butt edge 124 coincident with the butt edge 84 of the first flag 80. As seen in FIG. 7, the third flag 120 lays upon the lower left corner of the first flag.

The fourth flag 140 lays on top of the third flag 120 with its lower edge 142 coincident with a segment of the lower edge 122 of the third flag 120. The butt edge 144 of the fourth flag 140 is parallel to but spaced inwardly 2 inches from the butt edge 124 of the third flag 120.

Thus, a kit 180 consisting of four flags laying one on top of the other is created. The placement of flags may vary to provide extra strength where needed. In this embodiment, reinforcement of the ferrule and texturing of the ferrule is provided. The flags are not separated by protective layers, but rather are adjacent one another. The carbon fibers 90 of the bottommost flag, the first flag 80, are parallel to the lower edge 182 of the kit while the carbon fibers 110 of the second flag 100 and the carbon fibers 130 of the third flag 120 are roughly perpendicular to the lower edge 182 of the kit 80. Because the lower edge of the second flag 100 is askew with respect to the first flag 80, the carbon fibers 110 in the second flag are not precisely perpendicular to the fibers 90 of the first flag. The fifth flag 160 does not form part of this kit.

The kit 180 is then rolled upon a tapered mandrel 190 with the lower edge 182 being placed upon the mandrel first and being placed upon the mandrel generally parallel to the axis of the mandrel 190. The mandrel 190 has a butt end 192 and a tip end 194. The butt end 192 is slightly larger in diameter than the tip end 194. The mandrel is a tapered mandrel and can have either a simple, constant taper from one end to the other or a compound taper with the taper rate varying over the length of the mandrel 190. In the preferred embodiment, a simple taper is used.

The flag kit 180 is wrapped around the mandrel in several turns resulting in multiple layers of the first flag material and second flag material over most of the length of the mandrel. The taper and layer count of these first and second flags are calculated to provide appropriate strength and flex characteristics over the length of the finished rod segment.

Once the kit 180 is fully wrapped around the mandrel, the fifth flag 160 is wrapped around the rolled up kit with butt edge 164 generally coincident with the butt edge 48 of the first flag 80. The angled tip edge 166 of the fifth flag provides for a smooth wall thickness transition at the tip end of the fifth flag.

Once all the flags of the butt middle rod blank segment are assembled, the rolled up kit on the mandrel is wrapped with a heat shrink film tape 200 as seen in FIG. 8. The heat shrink film tape 200 is wrapped in a spiral covering the entire wrapped kit 198. The heat shrink film tape is a polypropylene tape about one inch wide. The tape is wrapped about 12 to 14 turns per foot around the assembly.

As seen in FIG. 9, an insulating film tape 202 is then wrapped around the mandrel 190, the wrapped kit 198, and the heat shrink film tape 200. The insulating film tape 202 is also wrapped in a continuous spiral at a rate of about 12 to 14 turns per foot covering the entire wrapped kit 198 and heat shrink film tape 200. The insulating tape is about one mil thick, one inch wide, and is a polytetrafluorethelyne tape. The assembly is ready for curing in a controlled temperature oven.

The flags for the remaining two rod segments, the tip middle rod segment and the tip rod segment, are described below. These flags are assembled into kits in a manner similar to the kit for the butt middle segment. The kits are then wrapped with both a heat shrink film tape and an insulating tape as described above and then they too are ready for curing in an oven.

Figure 5:
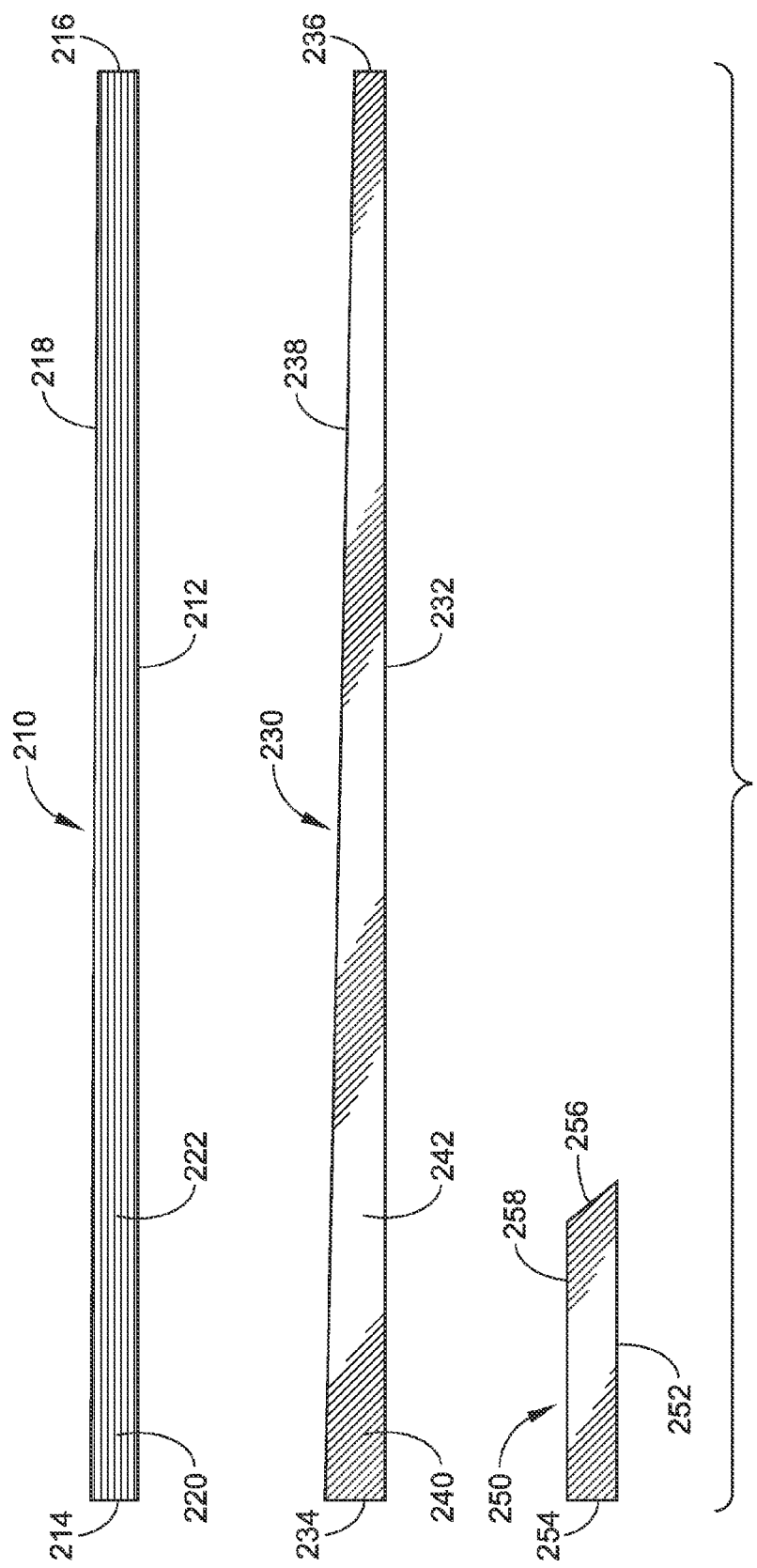
FIG. 5 shows the flags used to construct the tip middle segment blank of the fly rod of FIGS. 1 and 2.

Referring now to FIG. 5, the flags used in the tip middle fly rod segment 34 are illustrated. A tip middle first flag 210 has a shape similar to the other first flags already discussed. Thus, the tip middle first flag lower edge 212 is straight and 36 inches long. The butt edge 214 is also straight and is perpendicular to the lower edge 212 and is 2⅜ inches long. The tip edge 216 is also perpendicular to the lower edge 212, straight and 2 inches long. The fourth edge 218 is straight and connects the ends of the butt edge and tip edge remote from the lower edge 212. Carbon fibers 220 are parallel to one another and parallel to the lower edge 212 throughout the entire tip edge middle first flag 210. The carbon fibers 220 are embedded in a resin matrix 222.

The tip middle second flag has a shape similar to the tip middle first flag 210. The tip middle second flag lower edge 232 is 36 inches long and straight. The butt edge 234 is straight, perpendicular to the lower edge 232 and 1½ inches long. The tip edge 236 is straight, ¾ inch long and perpendicular to the lower edge 232. The fourth edge 238 interconnects the ends of the butt edge 234 and tip edge 236 remote from the lower edge 232. A tapered flag is thereby created. The carbon fibers 240 in the second flag are parallel to one another and at an angle of 45° with respect to the tip middle second flag lower edge 232. In the preferred embodiment, the carbon fibers 240 extend upwardly and to the left with respect to the lower edge. Other orientations can also be used. It has been found that using carbon fiber at a bias, particularly a 45° bias, helps maintain the straightness of the finished blanks in the narrow tip middle and tip segments.

The tip middle third flag 250 has a straight lower edge 252 which is 8 inches long. The fourth edge 258 is parallel to the lower edge 252 and 7 inches long. The butt edge 254 is perpendicular to the lower edge 252 and fourth edge 258 and 1¼ inches long. The tip edge 256 interconnects the ends of the lower edge 252 and fourth edge 258 remote from the butt edge 254. Thus, the third flag resembles a rectangle with a triangle appended at one side. Carbon fibers 260 in the third flag are parallel to one another and at an angle of 45° with respect to the lower edge 252 in an orientation identical to that of the carbon fibers in the tip middle second flag 230.

The tip middle flags 210, 230, 250 are stacked to form a kit with the first flag 210 on the bottom and the second flag 230 lying on top of it. The second flag 230 is laid so that its lower edge 242 is spaced somewhat upwardly (inwardly) from the lower edge 212 of the first flag. The end of the second flag lower edge 242 adjacent the butt edge is spaced upwardly ¾ of an inch while the tip end is spaced upwardly ⅜ of an inch. Because the butt edge and tip edge of the second flag 230 are both much shorter than the corresponding edges of the first flag, the second flag is almost entirely contained within the footprint of the first flag. The tip middle third flag 250 is laid upon the assembled first flag 210 and second flag 230 with its corner formed by the butt edge 254 and the fourth edge 258 coincident with the similar corner of the first flag 210. The third flag lower edge 252 is coincident with the first flag lower edge 212. These three flags are the complete kit for the tip middle rod segment and are wound upon a mandrel and wound with heat shrink film tape 200 and insulating film tape 202 in a manner identical to that described with respect to the butt middle segment.

Figure 6:
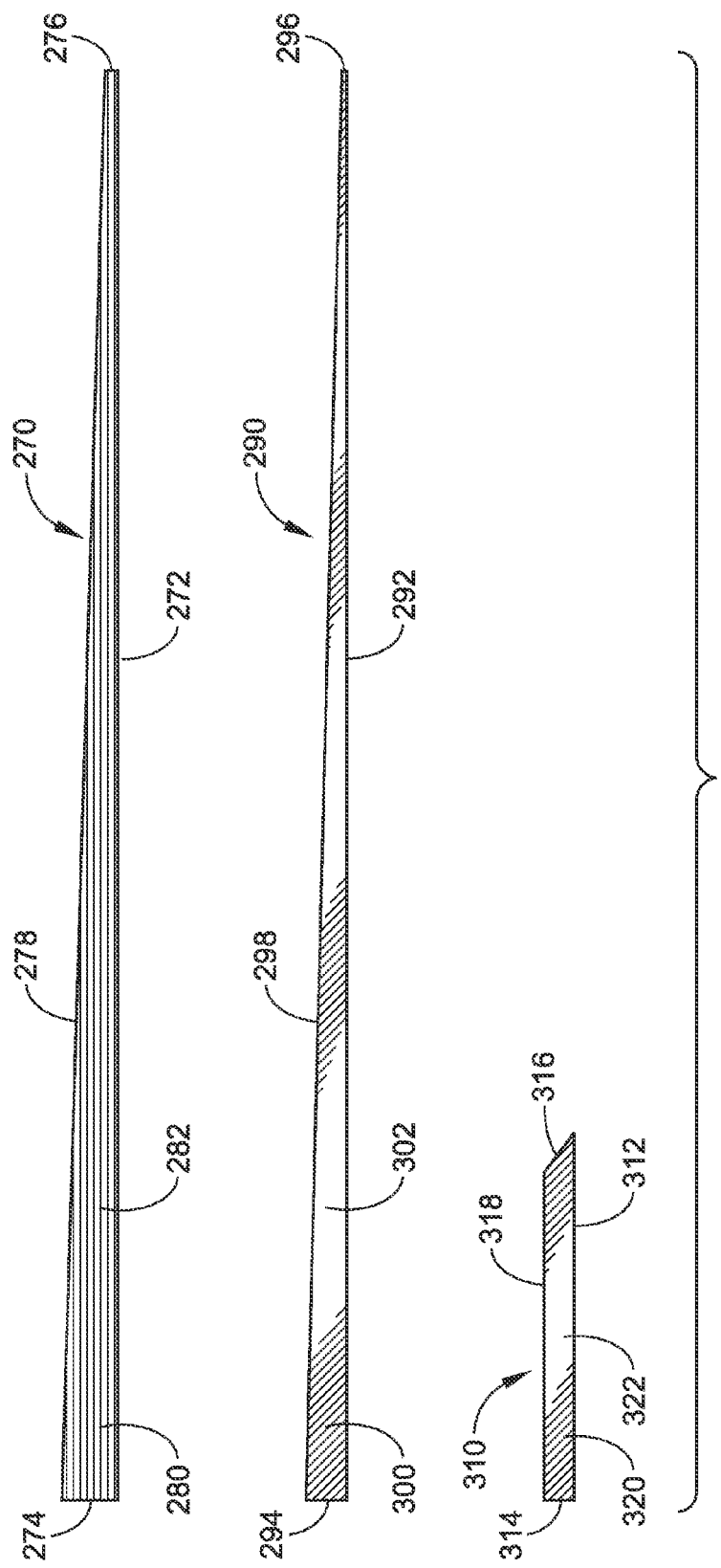
FIG. 6 shows the flags used to construct the tip segment blank used to construct the fly rods seen in FIGS. 1 and 2.

The flags used in constructing the tip segment of the fly rod are shown in FIG. 6. A tip first flag 270, a tip second flag 290 and a tip third flag 310 are used to create the kit 322 for the tip segment blank of the fly rod. The tip flags closely resemble the flags used in the tip middle segment. Thus, the tip first flag 270 has a straight lower edge 272 which is 35 inches long. The butt edge 274 is straight and perpendicular to the lower edge 272. The butt edge is 1⅜ inches long. The tip edge 276 is also perpendicular to the lower edge 272, straight and only 5/16 inches long. The fourth edge 278 connects the ends of the butt edge 274 and the tip edge 276 remote from the lower edge 272. Carbon fibers 280 are arrayed parallel to another and parallel to the lower edge 272. The carbon fibers 280 are embedded in a resin matrix 282.

The tip second flag 290 has a similar shape to the first flag 270. The tip second flag lower edge 292 is straight and 35 inches long. The butt edge 294 is perpendicular to the lower edge and 1 inch long. The tip edge 296 is also perpendicular to the lower edge 292 and ⅛ inch long. The fourth edge 298 interconnects the ends of the butt edge 294 and tip edge 296 remote from the fourth edge 298. A flag with four straight edges having a butt edge of 1 inch length and a tip edge of only ⅛ inch length is thereby created. Carbon fibers 300 in the tip second flag 290 are orientated parallel to one another at an angle of 45° with respect to the lower edge 292 as in the flags of the tip middle segment. The carbon fibers 320 are embedded in a resin matrix 302.

The tip third flag 310 has a straight lower edge 312 which is 9 inches long and a straight fourth edge 318 which is parallel to the lower edge and 8 inches long. The butt edge 314 is ¾ inch long and perpendicular to the lower edge 312 and the fourth edge 318. The tip edge 316 interconnects the ends of the lower edge 312 and fourth edge 318 remote from the butt edge 314. Carbon fibers 320 are parallel to one another and orientated at an angle 45° with respect to the lower edge 312 just as in the flags of the tip middle segment. The carbon fibers 320 are embedded in a resin matrix 322.

The three flags seen in FIG. 6 are stacked one on top of the other with the first flag 270 on the bottom, the second flag 290 on top of the first flag 270 and the third flag 310 on top of the first and second flags. The lower edges of all three flags are coincident and the butt edges of all three flags are coincident. The carbon fiber in resin layers of all three flags are in direct contact one with the other. This kit of flags is then ready for rolling upon a mandrel and for the application heat shrink film tape and insulating film tape as described hereinabove.

Resins and Carbon Fibers

Carbon fibers for use in creating the flags described above are available with different characteristics. Applicant does not purchase the carbon fibers directly but rather purchases prepregs consisting of carbon fibers embedded in a resin matrix with a backing and cover. Prepregs are available from several sources in various sizes using various fibers and various resin matrixes. The prepregs preferred in the present invention are available from Cytec Engineering Materials with a headquarters in Tempe, Ariz. All of the flags described above using in carbon fibers use high modulus carbon fibers.

Other fibers may be selected without departing from the spirit of this invention to provide different characteristics in a fishing rod blank. The resin systems used in the flags described hereinabove are also available having different characteristics in the prepregs available from Cytec and others. The matrixes used in the flags described above are epoxy based matrixes. A characteristic which sets the preferred matrixes apart from those used in prior art fly fishing rod blank applications is the cure temperature available for the matrix and used with the matrix. In the preferred embodiment, the curing process includes an interval of time in which the oven in which the blanks are cured is held at 350° F.

Another aspect of preferred resin matrixes used in the present invention is the use of a thermoplastic toughening epoxy based resin.

In a preferred embodiment, many of the flags described above are cut from a Cycom 2020 epoxy prepreg available from Cytec Engineering Materials and using uni-directional high modulus carbon fibers. All of the second, third and fifth flags for all of the segments described above are fabricated from this material in a preferred embodiment. The first flags in all four segments preferably comprise high modulus carbon fibers and Cycom 997 toughened epoxy resin in the prepreg. However, other resin systems are available which can be used in accordance with the invention as is known to those skilled in the art.

Method of Manufacture

The general steps of manufacturing a fly rod in accordance with the present invention are set forth below. Many of these steps have been described in greater detail above. The steps are described in a particular order below. However, it must be remembered that the ordering of the steps may sometimes be varied to meet manufacturing demands. For instances, it may be appropriate to construct all tip segments for a series of rods on one day and butt segments on a different day. Moreover, segments for multiple different weights of rods and multiple different segment combinations (two piece rods, three piece rods, four piece rods or seven piece rods) may be manufactured together. Those skilled in the art will understand where variations can be made without interfering with the creation and quality of the product.

Figure 10:
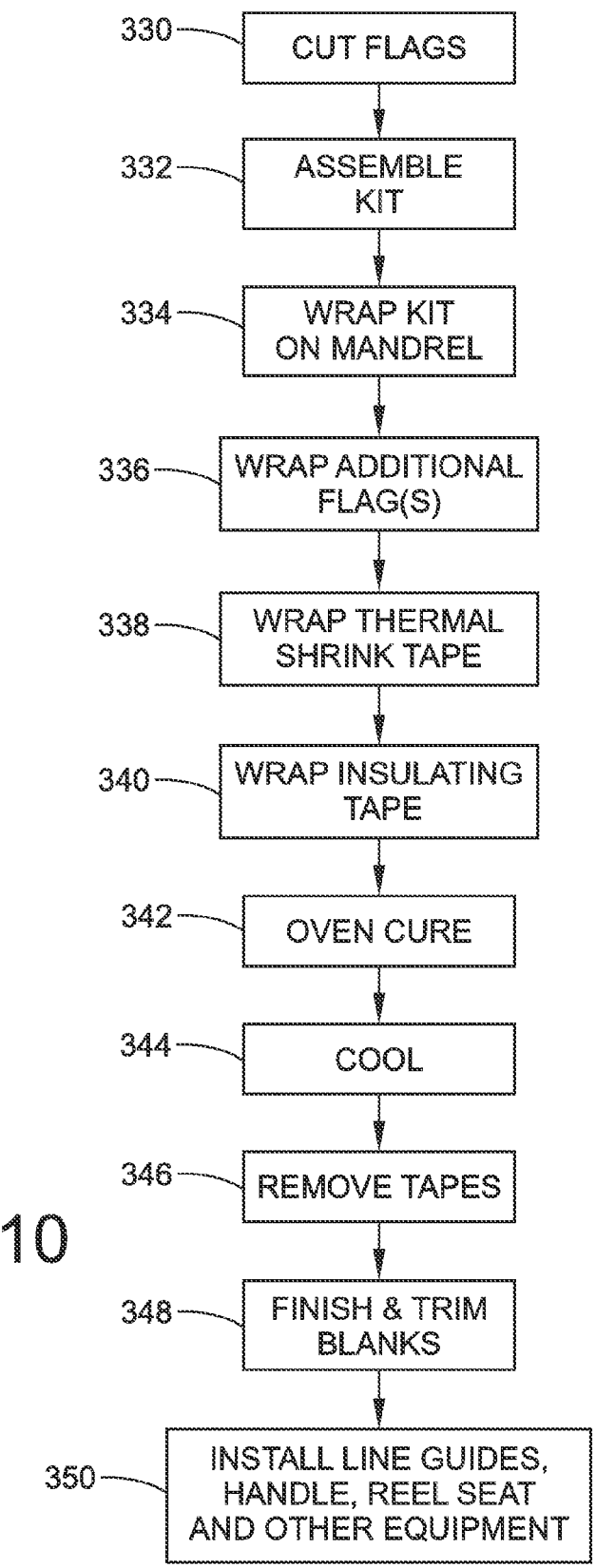

Referring now to FIG. 10, a series of steps are set forth. A fishing rod manufacturer will obtain rolls of prepreg on a backing with a cover sheet from Cytec or another source. One type of prepreg may be sufficient for construction of an entire fishing rod. On the other hand, several different prepregs may be used having different areal weight of fibers therein and also different types of fibers (carbon, boron, glass, or other) and different resin matrixes. As described above, several different prepregs are used in a preferred embodiment. One prepreg is the Cycom 2020 prepreg with unidirectional carbon fibers of uniform areal weight used in the second, third and fifth flags of each segment. The first flags are constructed from two different prepregs, one used for the butt, butt middle, middle tip flag and the second used for the tip first flag. The only difference between the two prepregs used in the first flags is the areal weight of carbon fiber used. A third prepreg of glass scrim in an epoxy resin is used for the fourth flag of the butt middle segment. The fiber type and matrix type used in this flag are not critical as the flag material is there for providing texture for the ferrule only and not for adding strength or flexibility to the segment.

The first step in the manufacturing process is the step of cutting the flags 330 to be used in constructing the fly rods scheduled to be manufactured. The flags are cut while still lying upon a backing and having a top cover protecting the epoxy layer and carbon fibers from contamination. Some flags are cut upside down to facilitate further manufacturing steps. After the selected flags are cut to the desired shape with the fiber orientation specified, the flags are assembled into a kit in step 332. In this step, either top covers or bottom backing sheets are removed from flags destined to be adjacent layers in the kit. One flag is then carefully laid on top of another so that wrinkles are avoided and proper fiber orientation is maintained. A kit in the preferred embodiment can comprise two to four layers. More layers can be added without deviating from this invention. Fewer layers can be used. For instance, prepregs can be purchased having woven fibers. One may achieve both axial carbon fibers providing axial strength, a selected number of circumferential fibers or bias fibers to provide hoop strength in a single weave. Thus, by judicious specification, a single prepreg cut to a single flag may form a kit in accordance with the present invention.

In the wrap step 334, the kit constructed in the assembly step 332 is wrapped upon a tapered mandrel maintaining proper fiber orientation. Even with the very tip end of the tip first flag, when the flag is rolled around the mandrel, at least three layers of the first flag are present in the rolled up kit. As described above, with respect to one of the segments of the fly rod blanks being constructed, an additional flag may be wrapped over the wrapped kit on the mandrel. This is not always necessary but can be useful in strengthening an area at particular risk such as the ferrule recess at the butt end of the butt middle segment. These additional flags are wrapped onto the flag and mandrel assemblies in the wrap additional flag step 336. This step is optional.

The fully assembled kits and additional flags on the mandrels are then wrapped with thermal shrink film tape in a first tape wrapping step 338. The heat shrink film tape is commercially available polypropylene shrink film and this wrapping step is conventional. The tape used in a preferred embodiment is about 1 inch wide and is wrapped at about 12-14 turns to a foot so that complete coverage of the assembled flags on the mandrel is accomplished. As is conventional, the thermal shrink wrapping tape provides compression of the layers of prepreg wrapped upon the mandrel during the curing of the assembly. In the past, wrapped mandrel and flag assemblies were then cured in an oven with a maximum cure temperature of about 180° F. The 180° cure temperature was the upper limit at which one could use the heat shrink film tape to achieve necessary compression on the assembled flag during curing. At temperatures above about 180° F., the shrink film tape deteriorated. Compression was not provided and uniform high quality blanks not created.

In the present invention, a second tape wrapping step 340 is provided. This is the step also illustrated in FIG. 9. In the second tape wrapping step 340, a polytetrafluorethylene (PTFE) film tape is wrapped around the assembled mandrel, flag, additional layers and shrink film tape. The insulating tape is about one inch wide and one mil thick. While other tapes are probably appropriate, the preferred tape is available from Dewal Industries and identified as part no. D/W202 (PTFE). The tape is wound in a spiral around the assembly as described above to provide complete coverage.

Following the second tape wrapping step, the mandrels and assembled components are placed in an oven for curing in the oven cure step 342. In a preferred embodiment, the oven curing takes in the neighborhood of 3½ to 4 hours. This consists of a ramp up period (the preferred period is ninety minutes) in which the temperature is increased in the oven at a controlled rate, a temperature hold period where the oven is held at a relatively constant temperature and a ramp down portion (the preferred portion is about an hour) where the temperature in the oven is reduced from the constant hold temperature to room temperature. In a preferred embodiment of the invention, the constant hold temperature is about 350° F. The oven is held at this temperature for two hours resulting in an advantageous cure of the resin and fiber composite part. The ramp up period, constant temperature period and ramp down period can be varied. Indeed, it is possible to eliminate the formal ramp down period in its entirely and simply remove the rod blanks from the oven at the end of the constant temperature period. The blanks then cool in ambient air. The cured components on the mandrels are allowed to cool in cool step 344. Cool step 344 may be a separate step or may form a portion of the oven cure step. After the mandrels and cured product are removed from the oven, the tapes, both the shrink tape and the insulating tape, are removed from the cured product in remove tape steps 346. The mandrels are often removed at this same time. A cured, tapered fiber reinforced resin body is thus created. This resin body can be finished by light sanding or the like (optional), painted (optional) and trimmed. The ends of the cured bodies can be cut off to provide a blank of the desired length. These functions are accomplished in the finish and trim blank step 348. Some blanks are sold in this state. Some anglers prefer to buy a set of segment blanks and construct their own fly rods. However, many blanks are used in the blank manufacturers own fly rod manufacturing operation. Line guides, a handle, a reel seat and other equipment are installed on the blanks in the equipment installation step 350. A finished fly fishing rod of several segments is ready for sale.

The process described above provides a high temperature resin cure system previously not believed available for fishing rods. As previously described, polypropylene shrink film was not thought to be usable in a cure system above 275°. In Applicant's process, polypropylene shrink film is used in a cure system in which a 350° F. cure is used. This allows the use of high temperature resins systems such as thermoplastic toughened epoxy resin systems. In particular, the 997 resin system described above, when cured at 350° as described above allows applicant to obtain a better bond between fibers and resin and therefore between multiple fibers through the resin. Loads may be shared more evenly and efficiently between fibers in the fly rod. Applicant has been able to significantly reduce the fiber areal weight and the overall weight of the fly rod blanks while maintaining and/or improving strength, flexibility and durability characteristics. Specifically, the fiber areal weight of the first flag in the tip segment is 120 grams per square meters plus or minus 5 grams and the fiber area weight in the prepregs used in the remaining three first flags (butt segment, butt middle segment, tip middle segment) is 95 grams per square meter (plus ten grams variance) plus gram. As can be seen from the description of the flags above, the first flags are by far the largest flags in each of the segments and are responsible for most of the weight in the finished blanks. The second flags used have a fiber areal weight in the range of 28-30 grams per square meter and are lighter than the first flags.

A fly fishing rod blank of very light weight and superior strength, durability and castability characteristics is thus provided.

The above description sets forth the materials needed and the steps used in implementing one embodiment of the present invention. Of course, these materials and steps are varied to achieve the same advantage or similar advantages for two piece rods, three piece rods, four piece rods, or seven piece rods. Moreover, the materials and dimensions described are appropriate for a five weight four piece fly rod. Those skilled in the art will recognize how to change dimension and other details to achieve the advantages of the present invention in rods of other weights such as three weight and below and 9 weight and above. Thus, the present invention is not specific to a five weight four piece fly rod but generally applicable to fly rods, and, indeed, fishing rods of any number of pieces and constructed to have any flex characteristics desired and handle any of a number of different fly line weights or spinning rod lower weights.

The above described blanks, flags and mandrels are for use in a fly rod in which the segments all have a simple, constant taper as opposed to a compound varying taper. Applicant has found that using the simple taper and flag system described above results in improved engagement between adjacent segments at the ferrules. This improves overall flex characteristic and castability of the rod. Ferrule engagement consists of a tapered recess (as formed by the mandrel described above) at the butt end of a particular segment and the corresponding tip end of an adjacent segment. The tip end is inserted into the butt end recess firmly. Applicant has found that the above process including the 350° cure provides improved engagement over the surface of this ferrule engagement. This results in improved energy transfer between adjacent segments and improved casting of the fly rod. It also improves durability and strength.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

Having thus described the invention, it is claimed:

1. A fishing rod comprising a rod segment constructed from a rod segment blank having an axis and an outer conical surface tapering from a butt end to a tip end, said rod segment carrying line guides adapted to guide a fishing line along said fishing rod; the improvement comprising:
   a first flag prepreg of selected dimensions comprising synthetic carbon fibers orientated parallel to one another in a first thermoplastic toughened resin matrix;
   a second flag prepreg of selected dimensions comprising synthetic carbon fibers orientated parallel to one another in a second thermoplastic toughened resin matrix;
   said dimensions of said second flag prepeg less than said dimensions of said first flag prepreg;
   a sheet including a first layer of said first flag synthetic fibers generally parallel to said rod segment blanks outer conical surface and a second layer of said second flag synthetic fibers wherein said second flag prepreg layed upon said first flag prepreg such that said synthetic fibers of said second flag are not parallel to said synthetic fibers of said first flag;
   said synthetic fibers of said second flag prepreg extend from said butt end to said tip end; and,
   said second flag prepreg layer of synthetic fibers not coplanar with said rod segment blank axis and orientated in a conical helix about 45° to a direction perpendicular to said rod segment blank axis.

2. The fishing rod of claim 1, wherein said rod segment blank includes at least two wraps of said sheet.

3. The fishing rod of claim 2, wherein said first flag prepreg has a fiber areal weight of less than 120 grams per square meter.

4. The fishing rod of claim 3, wherein said second flag prepreg has a fiber areal weight of less than 50 grams per square meter.

5. The fishing rod of claim 3, wherein said second flag prepreg has a fiber areal weight greater than 20 grams per square meter and less than 35 grams per square meter.

6. The fishing rod of claim 5, wherein said first and said second thermoplastic toughened resin matrices are epoxy based resins.

7. A fishing rod comprising a plurality of rod segment blanks each having an axis and an outer conical surface tapering from a butt end to a tip end, said rod segment blanks carrying line guides adapted to guide a fishing line along said fishing rod; the improvement comprising:
- a first flag prepreg of selected dimensions comprising synthetic carbon fibers orientated parallel to one another in a thermoplastic toughened resin matrix;
- a second flag prepreg of selected dimensions comprising synthetic carbon fibers orientated parallel to one another in a thermoplastic toughened resin matrix;
- a sheet including a first layer of said first flag synthetic fibers generally parallel to said plurality of rod segment blanks conical outer surface and a second layer of said second flag synthetic fibers wherein said second flag prepreg layed upon said first flag prepreg such that said synthetic fibers of said second flag are not parallel to said synthetic fibers of said first flag;
- said plurality of rod segment blanks include at least one wrap of said sheet wherein said wrap extends from said butt end to said tip end;
- said fishing rod comprises said plurality of rod segment blanks including at least a butt segment, a butt middle segment, and a tip segment;
- at least said butt middle segment further includes a third flag prepeg of selected dimensions comprising synthetic carbon fibers orientated parallel to one another in a thermoplastic toughened resin matrix wherein said synthetic fibers of said third flag are not parallel to said synthetic fibers of said first flag; and,
- said selected dimension of said second flag prepeg is less than said selected dimension of said first flag prepeg, and said selected dimension of said third flag prepeg is less than one half of said selected dimension of said second flag prepeg.

8. The fishing rod of claim 7, wherein said first flag has a fiber areal weight of less than 120 grams per square meter.

9. The fishing rod of claim 8, wherein said second flag has a fiber areal weight of less than 50 grams per square meter.

10. The fishing rod of claim 8, wherein said second flag has a fiber areal weight greater than 20 grams per square meter and less than 35 grams per square meter.

11. The fishing rod of claim 8, wherein said second flag has a fiber areal weight of about 28 to 30 grams per square meter.

12. The fishing rod of claim 7, wherein said thermoplastic toughened resin matrix is an epoxy based resin.

13. The fishing rod of claim 7, wherein said second flag prepreg layer of synthetic fibers not coplanar with said rod segment blank axis and orientated in a conical helix about 45° to a direction perpendicular to said rod segment blank axis.

* * * * *